Patented Aug. 6, 1946

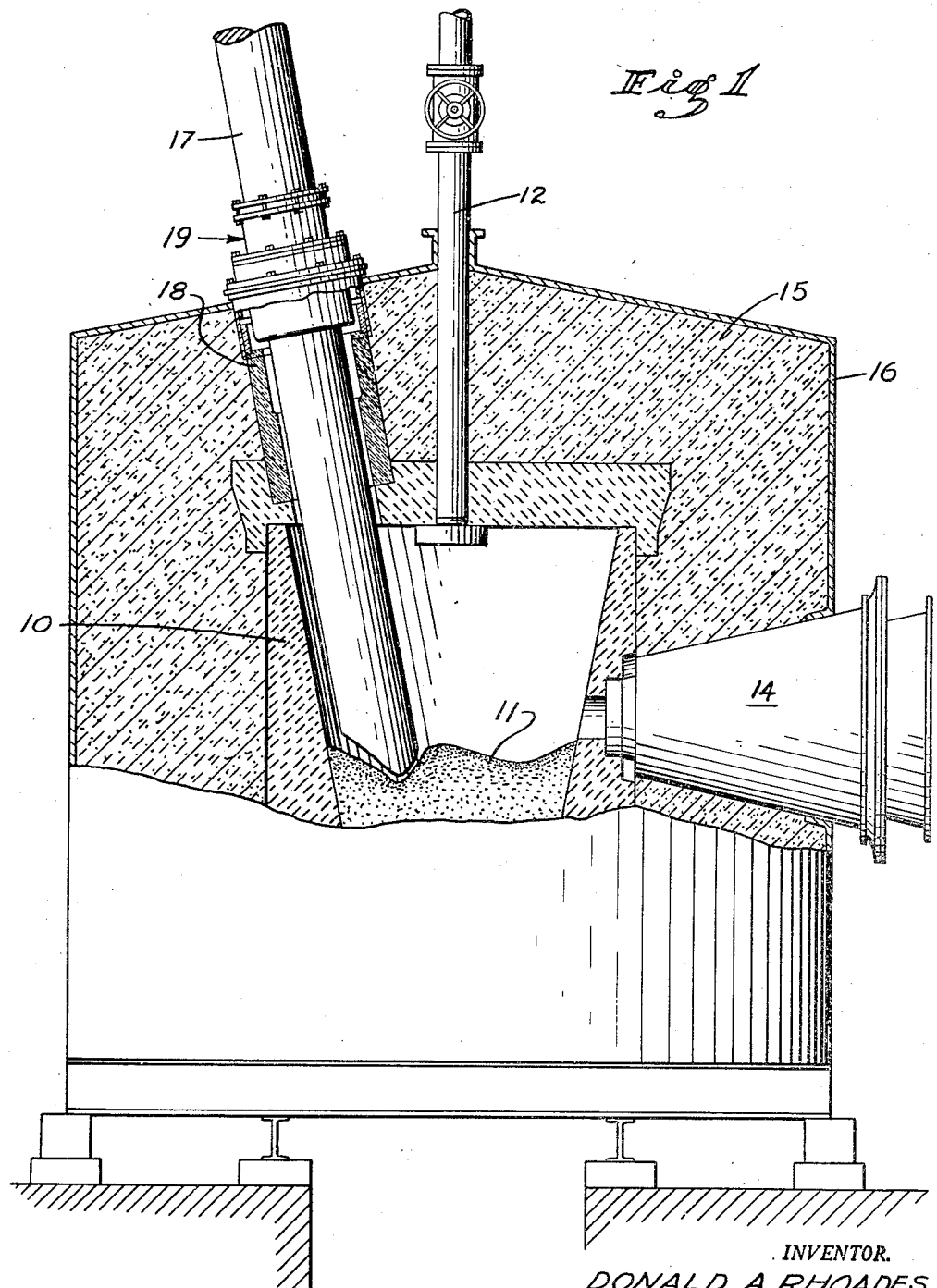

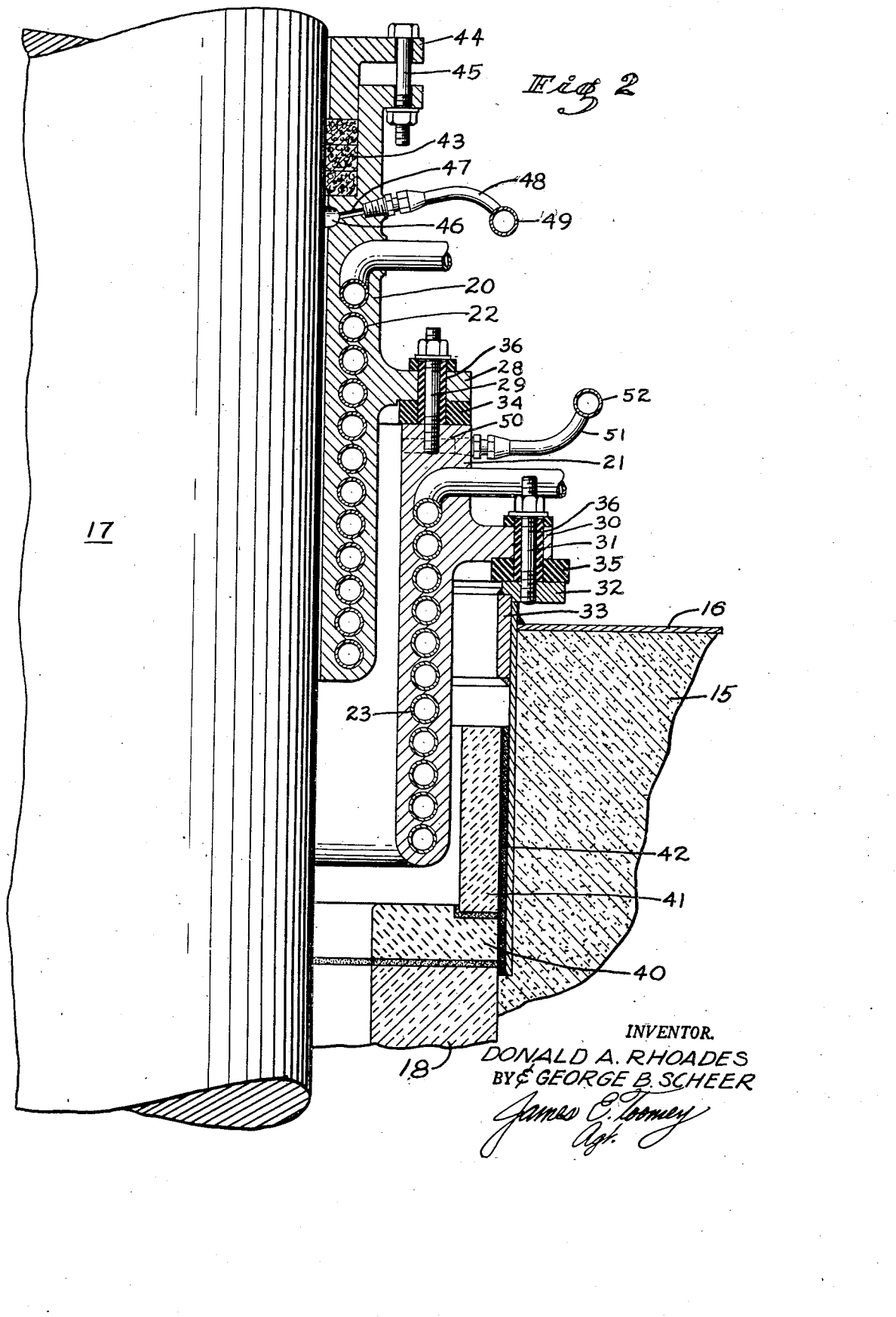

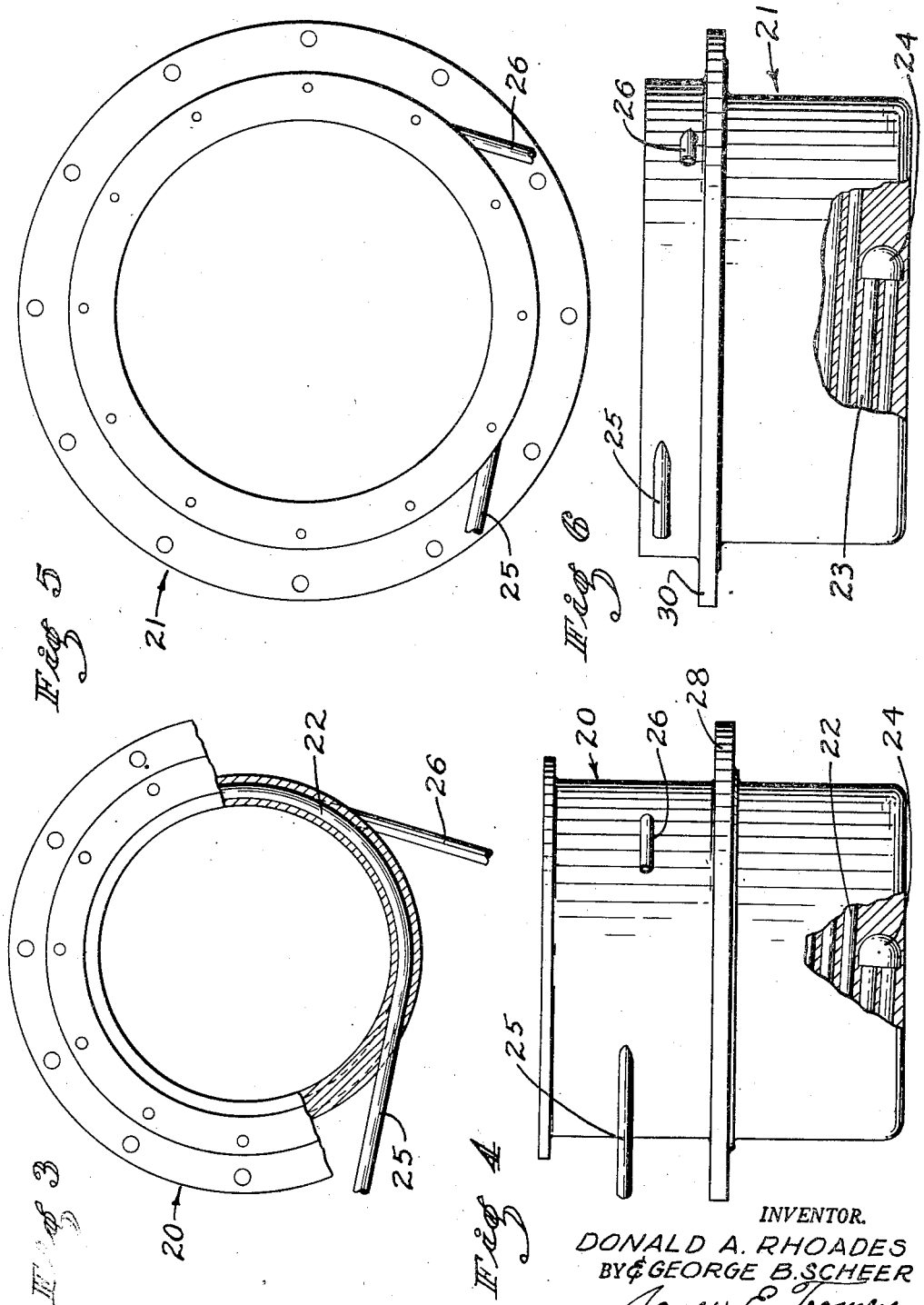

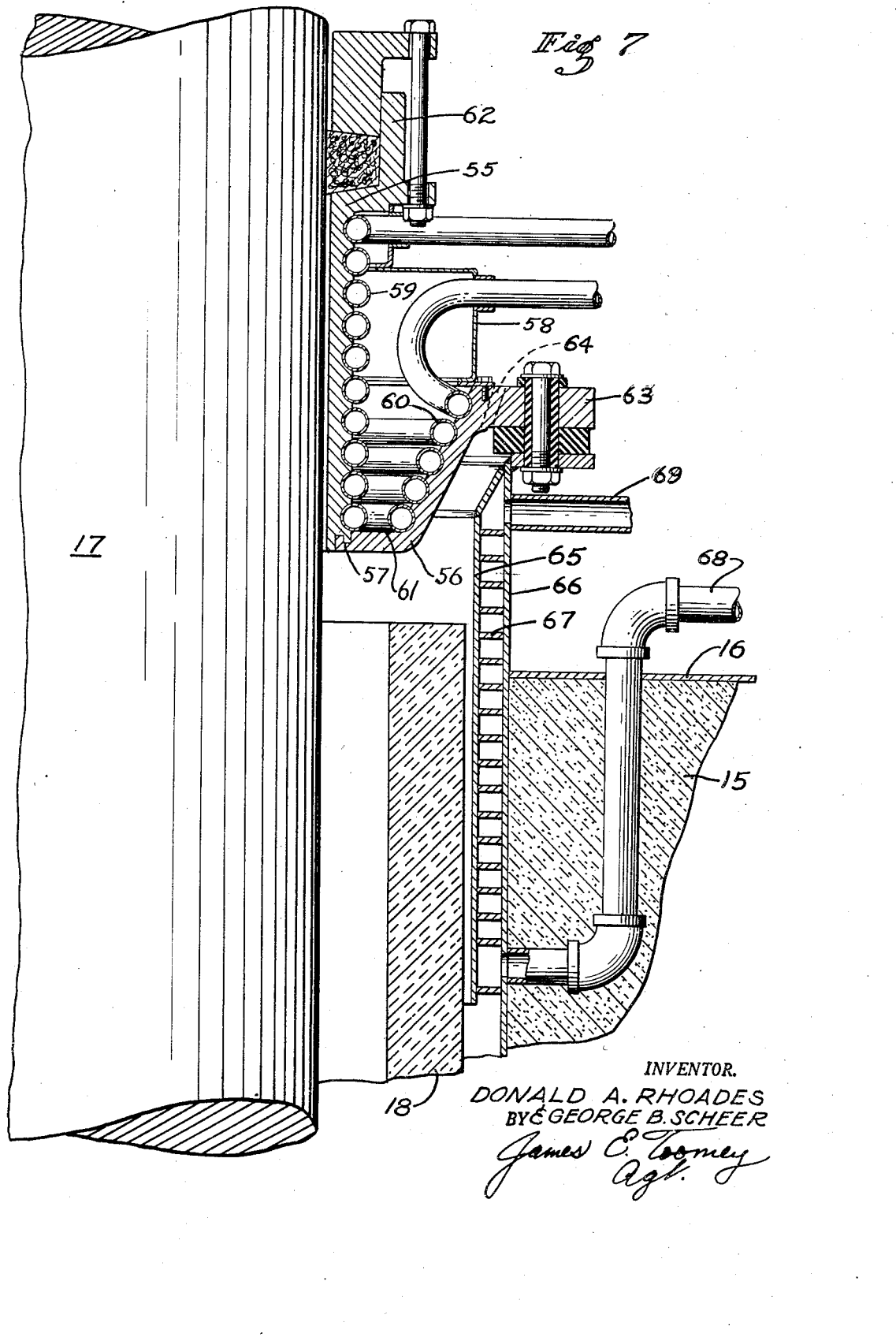

2,405,236

UNITED STATES PATENT OFFICE 2,405,236

ELECTRODE SEALING MEANS

Donald A. Rhoades, Palo Alto, and George B. Scheer, Berkeley, Calif., assignors, by mesne assignments, to The Permanente Metals Corporation, a corporation of Delaware Application July 24, 1944, Serial No. 546,350

17 Claims. (Cl. 13—17)

This invention relates to electric furnaces, and more particularly it relates to electrode cooling, sealing and insulating glands for use in closed electric arc furnaces.

Closed electric arc furnaces generally are used in operations wherein it is desired either to prevent contact between the furnace reaction and the atmosphere or to prevent the escape of substances to the atmosphere, or both.

The closed-type electric arc furnace art has always been confronted by a serious problem in producing a satisfactory seal between the electrodes and the furnace at the point where the electrodes enter the furnace. Care must be taken in providing a seal that is gas tight and which will withstand the high temperatures and other severe conditions which are imposed in many electrochemical operations and, where required, maintain electrical insulation. Among the most severe of such operations is the electrothermal process for production of metallic magnesium from magnesium oxide by the use of a carbonaceous reducing agent. This process under either reduced or positive pressure is carried out at temperatures in the neighborhood of 2000° C. and produces a highly pyrophoric product which requires that the furnace be tightly sealed from the atmosphere. Furthermore, the reducing atmosphere which is created as a result of this process attacks the apparatus heretofore used for gas seals and causes rapid failure thereof.

It is an object of the present invention to provide a satisfactory gas tight seal between the electrodes and the furnace opening of a closed type electric arc furnace, particularly in connection with high temperature electric furnace operations such as the electrothermal process for the production of metallic magnesium referred to above.

One of the principal objects is the provision of an insulated electrode gland capable of operating over extended periods at temperatures substantially in excess of those employed in prior practice.

Another object is to improve the application of heat protective measures to the insulation of the electrode insulators of electric furnaces.

Another object is to provide a gas tight seal rendering possible either reduced or positive pressure operations.

An additional object is to provide a seal of materials capable of withstanding without failure the severe conditions of high electric current densities, high temperature and reducing atmosphere.

A further object is to provide a seal which cools the electrodes at the point where they enter the furnace so as to avoid oxidation of the portions thereof which are exposed to the atmosphere.

A still further object is to provide a suitably electrically insulated seal wherein the insulation is so located that it is unaffected by the furnace conditions.

A still further object is to provide means for alignment and support of the electrodes with respect to the furnace.

Other objects and advantages of the invention are made apparent in the detailed description of the invention wherein reference is made to the accompanying drawings illustrating a typical embodiment thereof.

In general the invention comprises a sealing means for closed electric arc furnaces which means is adapted to encircle an electrode at the point where the electrode enters the furnace and which comprises a gland assembly having packing and cooling means. The cooling means of the gland assembly comprises a pair of concentrically arranged metallic jackets or the like advantageously having means therein for the circulation of a cooling medium. One of the metallic jackets is located immediately adjacent the electrode and the other is spaced therefrom. The metallic jackets are insulated from the supporting means for the gland assembly, which is generally the furnace wall, or from each other, or both.

The foregoing and other structural features of the invention are illustrated in the accompanying drawings wherein:

Figure 1 is a diagrammatic view in vertical cross section of an arc type electric furnace of the kind used in the carbothermic process for the production of magnesium and including an electrode gland which is constructed in accordance with the present invention.

Figure 2 is an enlarged vertical section through one half of the electrode gland shown in Figure 1.

Figure 3 is a plan view partially in section of the inner cooling jacket of the gland shown in Figure 2.

Figure 4 is a view in elevation of the jacket shown in Figure 3 parts thereof being shown in section.

Figure 5 is a plan view of the outer cooling jacket shown in Figure 2.

Figure 6 is a view in elevation of the jacket shown in Figure 5 with parts in section, and Figure 7 is an enlarged vertical section through one half of an electrode gland which comprises a modification of the invention.

Referring to the drawings in detail a typical closed electric arc furnace is shown in Figure 1 as comprising a crucible 10 adapted to contain a conducting bed 11 on to which is fed the reactants which in the case of the carbothermic process would consist principally of carbon and magnesium oxide. The reactants are introduced into the crucible through a tube 12 which enters through the top of the furnace. The product of the reaction of these materials, due to the high temperatures at which the reaction occurs, is in vapor form and discharges through an orifice 14 provided with means for shock chilling to prevent reversal of the reaction.

The crucible 10 is surrounded by a thick body of insulation 15 which is held in place by an exterior shell 16. One carbon electrode, of which there may be several, is shown at 17 as entering the crucible through a carbon sleeve 18, and as guided and protected at its point of entry, particularly through the outer shell 16 of the furnace, by a gland generally indicated at 19 in Figure 1 and shown in greater detail in the other figures of the drawings.

The gland 19 is illustrated in Figure 2 as comprising an inner cooling jacket 20 and a similar outer cooling jacket 21. The inner jacket 20 which is also shown in Figures 3 and 4 and the outer jacket shown in Figures 5 and 6 are substantially the same in construction and each comprises a helical coil arrangement for the circulation of a liquid cooling medium which coils are shown at 22 and 23, respectively, and so arranged that the directional flow of the coolant alternates in each bend. By the arrangement the bends containing the liquids flowing in opposite paths are connected at their lower ends by a return bend shown at 24 in Figures 4 and 6 so that cooling liquid entering through the upper exposed end of the coil 25 will flow to the bottom of the jacket through one system then through the return bend and upwardly through the other system and out through its end 26. The main body portion of the jackets 20 and 21 are shown herein as castings of a metal having good heat conducting properties in which the coils are embedded during the casting operation. Such material as copper, bronze, iron, steel and silver may be used in the manufacture of these castings, and aluminum and magnesium are also desirable for this purpose, and particularly advantageous because of their light weight. The coils themselves are likewise preferably made of a metal through which heat is readily conducted, such for example as copper tubing which is readily shaped into coils of this kind. It is not necessary that the coils be embedded in the castings as herein shown nor is it necessary in fact that coils be used at all, as the jackets may be formed of hollow castings through which a cooling medium is circulated, or they may be made of hollow castings with coils placed on the inside thereof with a suitable heat transfer medium filling the voids, or they may be built up of metal plate or cast sections joined together to form a metal jacket within which the coils are disposed in a manner so as to give good heat transfer, such as by silver soldering to the inner walls of the plates or the like (see Figure 7). The invention also contemplates the use of open coils which are not embedded in nor protected by metal or any material. The cooling means or the coils may also be embedded in or protected by refractory material rather than metal so long as the material has good heat conductivity. Metal is preferred because of its high conductivity and structural strength and also because in carbothermic furnaces the vapors tend to react chemically with many refractories with undesirable results.

The cooling medium circulated through the coils in the cooling jackets may be of any conventional kind, either water or oil being satisfactory, though oil is preferable in a carbothermic furnace because of the objectionable reactions which would take place in the event of any possible leakage of the coolant to the interior of the furnace. In addition the coolant is preferably of high thermal conductivity and low viscosity, and capable of circulating at high velocity through coils or the like.

The arrangement of the cooling jackets 20 and 21 with relation to the carbon electrode 17 and with relation to each other is best illustrated in Figure 2 wherein the inner jacket 20 is shown as surrounding the electrode and embracing the same with a sliding fit so that the electrode is guided for feeding movement toward the conducting bed in the crucible. This jacket carries an outwardly extending radial flange 28 which overlies and is connected to the top edge of the jacket 21 by bolts 29. The jacket 21 carries a similar flange 30 connected by bolts 31 to a flange 32 which projects radially from a reinforcing annulus 33 arranged within the opening of the furnace shell through which the electrode enters. Either or both of these connections, which support and which concentrically align the jackets with relation to the electrode and the shell, may include dielectric insulation in the form of annular horizontally disposed rings 34 and 35. Either or both of the bolts 29 and 31 are jacketed with insulating material, as indicated at 36 to perfect the electrical insulation at these connections. Insulation of at least one of these connections is necessary because the inner jacket 20 is in direct contact with the carbon electrode which is at high potential, while the shell of the furnace which supports the cooling jackets is at ground. Insulation at both places is preferred as a safety factor in the event of breakdown of the insulation at one connection.

The use of horizontal annular insulation between each cooling jacket and between the outer jacket and the furnace, such as is shown at 34 and 35, respectively, in Figure 2, is advantageous in high temperature operations because the material is not exposed to the direct radiation of the furnace rays and is well removed from the vapors and gases given off in the reaction zone thus rendering possible the use of efficient insulating material such as structurally reinforced thermosetting plastics rather than brittle or friable insulation which has poor sealing characteristics and presents problems of maintenance. In operations where the temperatures are less excessive the use of vertical insulation in the gap between the inner and outer cooling jackets is satisfactory. It may be desirable to insert electrical current leakage detecting means in either or both of the insulating areas in question so as to ascertain when failure occurs.

The lower end of the inner jacket 20 is shown as projecting into the furnace in the direction of the crucible wherein the high temperatures originate and as this jacket is in direct contact with the electrode it serves to conduct heat away from the electrode for protection of the exposed portion thereof against the oxidizing effect of the atmosphere outside of the furnace. The outer cooling jacket 21 is concentric to and spaced from the inner jacket as shown and extends downwardly a considerable distance beyond the lower end of the inner jacket. The lower depending end of the outer jacket therefore absorbs a considerable volume of heat from the electrode through radiation to lessen the burden on the inner jacket, reduce the temperature over the entire area of the inner jacket which is exposed to heat from the crucible, and protect the insulating material from direct furnace rays. The lowermost part of the outer jacket 21 is shielded from heat radiated directly from the crucible because it is set back beyond the shoulder provided by the upper end of the carbon sleeve 18. It may be also additionally protected as shown, by an annular collar of refractory material which rests on top of the carbon sleeve 18. This collar which is L shaped in cross section may be made of a single piece or may be of built up construction. A function of this structure is to reduce arcing between carbon sleeve 18 and the outer jacket 21 and thus maintain the outer jacket electrically neutral when used in conjunction with the double insulation as shown in Figure 2 at both 34 and 35. A desirable arrangement is that shown wherein it is formed of a horizontal member 40 of a magnesite refractory such as electrically fused magnesia and a vertical unit 41 of a sillimanite type brick. In alternative arrangements the shape of the refractory pieces may be varied to suit the furnace designs and the conditions. Likewise the refractory materials can be varied so long as they are capable of withstanding the conditions to which they will be subjected. Satisfactory refractory materials include sillimanite, zirconia, titanium dioxide, magnesia, alumina, chrome, spinels of magnesia and alumina, spinels of magnesia and chrome and electrically fused magnesia. A packing 42 of asbestos or the like may be used between the refractory and the metal wall of the electrode well.

Good results can also be obtained by coating the inner and outer jackets with an electrical insulating material such as an enamel, a glass frit, or other suitable coating. The object is to provide a coating which will provide sufficient electrical insulation to diminish the possibility of arcing between the gland jackets and other parts at electrode potential and parts at different potential and which will not substantially lessen the cooling effect of the jackets. It is essential that the coefficient of expansion of the insulating coating approximate that of the coated material.

Arranged adjacent the upper exposed end of the jacket 20 for contact with the carbon electrode at a point where it has been subjected to the cooling effect of both the inner and outer cooling jackets is a ring of conventional fibrous packing material 43 which is compressed by a flanged collar 44 drawn downwardly by nuts and bolts such as shown at 45. Such compression causes expansion of the ring of packing material 43 into sealing engagement with the electrode to prevent the passage of gas either into or out of the furnace through the opening which admits the electrode.

Machine surface electrodes are desirable to minimize wear and tear on packing, particularly where the furnace is operated at either reduced or elevated pressure, and to allow for close tolerance between electrode and gland, which is desirable for good heat transfer and alignment of the electrode.

The interspace between the inner and outer cooling jackets is advantageously swept with high pressure inert gas for the purpose of providing an insulation effect and to prevent the deposit of foreign materials therein which would tend to cause arcing. The sweeping gas may be supplied to this space through ports in the upper end of the outer jacket 21 as indicated in dotted lines at 50 which are supplied by tubes 51 connecting with a manifold 52. In operations it has been found useful to continuously supply the interspace with inert gas of fairly high pressure and to periodically supply the interspace with blasts of gas at considerably higher pressure. The space between the electrode and the inner gland jacket may be flushed in a similar manner. The gas enters through an annular channel 46 formed in the inner surface of the jacket 20 and is supplied by a plurality of ports, such as indicated at 47, which communicate with tubes 48 leading to a manifold 49. The space between the outer cooling jacket 21 and the wall of the well through which the electrodes enter the furnace may be likewise swept with an inert gas through similar means though in the present instance this is found unnecessary. This latter space may even in some instances be eliminated by placing the outer jacket directly against the wall of the electrode well (see Figure 7) or by embedding the jacket in the wall so that only the inner surface of the jacket is exposed to the heat which rises from the crucible.

By the arrangement herein shown the carbon electrode is adequately guided for its feeding movement into the crucible of the furnace by means which are electrically insulated from the furnace itself. The cooling jackets which embrace and guide the electrode have proven sufficient to cool the electrode at its point of entry into the furnace to such a degree that a perfect gas tight seal may be effected against the electrode with conventional packing means and to such degree that the portion of the electrode exposed to the atmosphere will not oxidize to any marked degree. The arrangement of the concentric cooling jackets is such, with the outer one being located closer to the crucible than the inner, that both relieve the carbon electrode and adjacent areas of excessive heat while each of the cooling jackets are themselves adequately protected against too great a heat load which would result in their failure. Alternatively, the inner and outer jackets can be positioned so that the base of the lower end of each lie in substantially the same horizontal plane, or if desired in any other position with respect to each other which will accomplish satisfactory cooling.

The electrode gland assembly disclosed in Figure 7 is made up of fabricated metal jackets. The inner jacket is constructed with an outwardly and upwardly inclined portion adjacent its lower end to accommodate a coil for the circulation of cooling liquid. The outer jacket is formed directly against the wall of the furnace, or the wall of the electrode well. The inner jacket includes an inner member 55 which embraces the electrode and a lower outer member 56 extending outwardly and upwardly and upwardly therefrom and connected thereto by an interlocking joint 57 preferably brazed or otherwise sealed against the escape of furnace vapors to the atmosphere. The outer member 56 is considerably shorter than the inner member and the space between the upper edge and the upper portion of the inner member may be inclosed by a shell 58 made up of plate metal and serving as an additional seal against vapor leakage. In this modification the coil of the inner jacket forms a single helix 59 against the inner member 55 and a second single helix 60 against the outer member 56. The helix 59 and the helix 60 are connected at 61 in the bottom of the jacket to provide for a continuous flow of cooling liquid in through one part of the coil and out through the other.

The upper portion of the inner member 55 of the fabricated inner jacket is flared to provide an annular packing gland 62 the function and construction of which are like those hereinabove disclosed.

The outer edge of the member 56 extends to form a supporting flange 63 insulated from the furnace as shown. A pluraltiy of ports 64 may be provided in this outer member for the introduction of a sweeping gas to the space between it and the outer gland. A sweeping gas may also be introduced to the space between the electrode and the inner jacket as described in connection with Figure 2.

The outer jacket is shown as made up of inner and outer shells the inner shell being indicated at 65 and the outer shell in this case being the metal wall 66 of the electrode well. A flange or baffle 67 is wound spirally between the two shells and secured to at least one of the shells by welding or the like so as to form a helical path for cooling liquid entering through pipe 68 at the bottom and passing outwardly through the pipe 69 at the top of the jacket. The outer shell of the outer jacket which is illustrated as a part of the furnace may also be formed of a separate plate and insulated from the furnace if desired.

The fabricated design shown in Figure 7 illustrates one type of fabricated electrode gland which may be constructed in accordance with the present invention. The various elements of each of the two fabricated jackets illustrated therein may be secured together by means of soldering, welding, brazing, or the like, and in some cases tongue and groove or interlocking connections between the parts are useful in effecting a tight seal.

It is to be understood that this invention may be applied to any electric furnace or the like wherein it may be adapted for use and is not to be limited to the electro-thermal process for the production of magnesium. Various modifications of the several structures herein shown may be made within the scope of the claims.

We claim:

1. In an electric furnace of a sealed type where the inside and outside pressures vary, a passage in the wall of said furnace adapted to receive an electrode, an electrode extending therethrough, sealing means between said electrode and said furnace walls, said sealing means comprising a gland assembly having packing means and cooling means, said cooling means comprising a pair of concentrically arranged units encircling said electrode, one of said units being located immediately adjacent the electrode and the other being spaced therefrom, said units being insulated from each other and said gland assembly being insulated from the supporting means therefor.

2. In an electric furnace, a passage in the wall of said furnace adapted to receive an electrode, an electrode extending therethrough, sealing means between said electrode and said furnace walls, said sealing means comprising a gland assembly having packing means and cooling means, said cooling means comprising a pair of concentrically arranged jackets, one of said jackets being located immediately adjacent the electrode and the other being spaced therefrom, each of said jackets having copper coils embedded therein and an annular flange about the outer periphery thereof, the annular flange of the jacket located adjacent the electrode being adapted to rest upon the top of the jacket spaced from the electrode, the annular flange of the jacket spaced from the electrode being adapted to rest upon the supporting means for said gland assembly, insulating means between each of said annular flanges and the members upon which they rest, and means for flushing out the interspace between each of said jackets.

3. A cooling and sealing means for an electrode at its point of entry into an electric furnace which comprises cooling glands embracing the electrode and extending toward the interior of the furnace, radially projecting supporting flanges adjacent the exterior ends of said glands, and insulating members underlying said flanges to electrically insulate the glands from each other and from the furnace.

4. A cooling and sealing means for an electrode at its point of entry into an electric furnace which comprises cooling glands embracing the electrode and extending toward the interior of the furnace, radially projecting supporting flanges adjacent the exterior ends of said glands, and insulating members underlying said flanges to electrically insulate the glands from each other and from the furnace, said insulating members comprising solid pieces of insulating material disposed out of the path of direct heat radiation from the furnace.

5. A cooling and sealing means for an electrode at its point of entry into an electric furnace which comprises cooling glands embracing the electrode and extending toward the interior of the furnace radially projecting supporting flanges adjacent the exterior ends of said glands, and insulating members underlying said flanges to electrically insulate the glands from each other and from the furnace, said insulating members comprising solid pieces of insulating material disposed out of the path of direct heat radiation from the furnace, and means for directing a sweeping gas toward the interior of the furnace from the area where the glands and insulating means are disposed.

6. In an electrode insulator of the character described, an electrode jacket, a support therefor, an insulating member between said jacket and said support; said support including an element defining a relatively narrow space surrounding said jacket, which space is open at one end and closed at the other end by said insulating member, and means for cooling said space.

7. In an electrode insulator of the character described, an electrode jacket, a support therefor, an insulating member between said jacket and said support; said support including an element defining a relatively narrow space surrounding said jacket, which space is open at one end and closed at the other end by said insulating member, and means for cooling said space including means for circulating a coolant within said element.

8. In an electrode insulator of the character described, an electrode jacket, a support therefor, an insulating member between said jacket and said support; said support including an element defining a relatively narrow space surrounding said jacket, which space is open at one end and closed at the other end by said insulating member, and means for cooling said space including means for circulating a coolant within said electrode jacket.

9. In an electrode insulator of the character described, an electrode jacket, a support therefor, an insulating member between said jacket and said support; said support including an element defining a relatively narrow space surrounding said jacket, which space is open at one end and closed at the other end by said insulating member, and means for cooling said space including means for directing a sweeping gas therethrough.

10. An electrode insulator as defined in claim 5 in which said insulating member is disposed out of the direct path of heat transmitted by radiation through the length of said space.

11. In an electrode insulator of the character described, an electrode jacket, a support therefor, a plurality of concentric insulating members of respectively different diameters interposed between said jacket and said support, and a second jacket located between said members so as to divide into a plurality of spaces the circumferential space around said electrode jacket.

12. An electrode insulator as defined in claim 11 in which at least one of said insulating members is disposed out of the direct path of heat transmitted by radiation through the entire length of said spaces.

13. In an electrode insulator of the character described, an electrode jacket, a support therefor, a plurality of concentric insulating members of respectively different diameters interposed between said jacket and said support, a second jacket located between said insulating members so as to divide into a plurality of spaces the circumferential space around said electrode jacket, and means for cooling at least one of said spaces.

14. In an electrode insulator of the character described, an electrode jacket, a support therefor, a plurality of concentric insulating members of respectively different diameters interposed between said jacket and said support, a second jacket located between said insulating members so as to divide into a plurality of spaces the circumferential space around said electrode jacket, and means for cooling at least one of said spaces including means for directing a sweeping gas therethrough.

15. In an electrode insulator of the character described, an electrode jacket, a support therefor, a plurality of concentric insulating members of respectively different diameters interposed between said jacket and said support, a second jacket located between said insulating members so as to divide into a plurality of spaces the circumferential space around said electrode jacket, and means for cooling at least one of said spaces including means for circulating a coolant within said electrode jacket.

16. In an electrode insulator of the character described, an electrode jacket, a support therefor, a plurality of concentric insulating members of respectively different diameters interposed between said jacket and said support, a second jacket located between said insulating members so as to divide into a plurality of spaces the circumferential space around said electrode jacket, and means for cooling at least one of said spaces including means for circulating a coolant within said second jacket.

17. An electrode insulator as defined in claim 13 in which at least one of said insulating members is disposed out of the direct path of heat transmitted by radiation through the entire length of said spaces.

DONALD A. RHOADES.
GEORGE B. SCHEER.